United States Patent
Sakai et al.

[11] Patent Number: 6,151,966
[45] Date of Patent: Nov. 28, 2000

[54] SEMICONDUCTOR DYNAMICAL QUANTITY SENSOR DEVICE HAVING ELECTRODES IN RAHMEN STRUCTURE

[75] Inventors: Minekazu Sakai, Kariya; Yukihiro Takeuchi, Nishikamo-gun; Kazuhiko Kano, Toyoake; Seiji Fujino, Toyota; Tsuyoshi Fukada, Aichi-gun; Hiroshige Sugito, Nagoya; Minoru Murata, Kariya; Hiroshi Muto, Nagoya; Hirofumi Higuchi, Okazaki; Kenichi Ao, Tokai, all of Japan

[73] Assignee: Denso Corporation, Kariya, Japan

[21] Appl. No.: 09/304,849

[22] Filed: May 5, 1999

[30] Foreign Application Priority Data

May 11, 1998 [JP] Japan ................................. 10-127419

[51] Int. Cl.[7] ............................. G01P 15/125; G01L 1/00
[52] U.S. Cl. ....................................... 73/514.032; 73/862
[58] Field of Search .......................... 73/514.32, 514.36, 73/514.38, 862.52, 862.541, 862.68, 862, 862.381

[56] References Cited

U.S. PATENT DOCUMENTS 5,563,343  10/1996  Shaw et al. .
5,610,335  3/1997  Shaw et al. .

*Primary Examiner*—Richard A. Moller
*Attorney, Agent, or Firm*—Pillsbury Madison & Sutro LLP

[57] ABSTRACT

A semiconductor accelerometer device is formed on an SOI substrate by micro-machining. A movable unit is supported at both ends, and a weight portion is movable in response to acceleration exerted in the detection direction. A movable electrode is formed in a comb shape integrally with the weight portion. A pair of fixed electrodes in a comb shape are cantilevered and interleaved with the movable electrode to face the movable electrode. A plurality of through holes is provided in the electrodes so that the electrodes have Rahmen structure which is a series of rectangular frames. This structure reduces the weight of each electrode while increasing the strength against twist force. The electrodes are less likely from breaking in response to an acceleration exerted in a direction perpendicular to the normal detection direction because of reduced weight.

23 Claims, 11 Drawing Sheets

SEMICONDUCTOR DYNAMICAL QUANTITY SENSOR DEVICE HAVING ELECTRODES IN RAHMEN STRUCTURE

CROSS REFERENCE TO RELATED APPLICATION

This application relates to and incorporates herein by reference Japanese Patent Application No. 10-127419 filed on May 11, 1998.

BACKGROUND OF THE INVENTION

1. Field on the Invention

The present invention relates to a semiconductor type dynamical quantity sensor device and, more particularly, to a differential capacitor type semiconductor sensor device, which may be used as an accelerometer device.

2. Related Art

Figure 22:
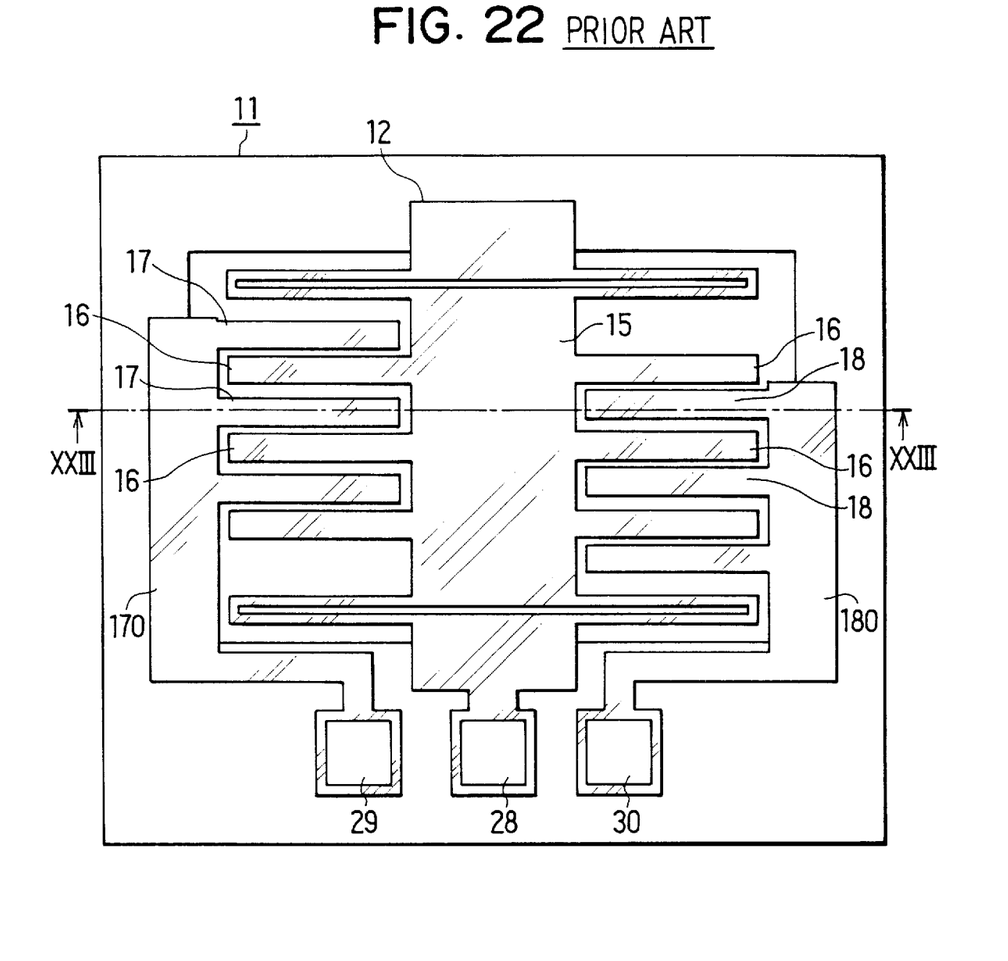
FIG. 22 is a schematic plan view of a conventional semiconductor accelerometer device.
Figure 23:
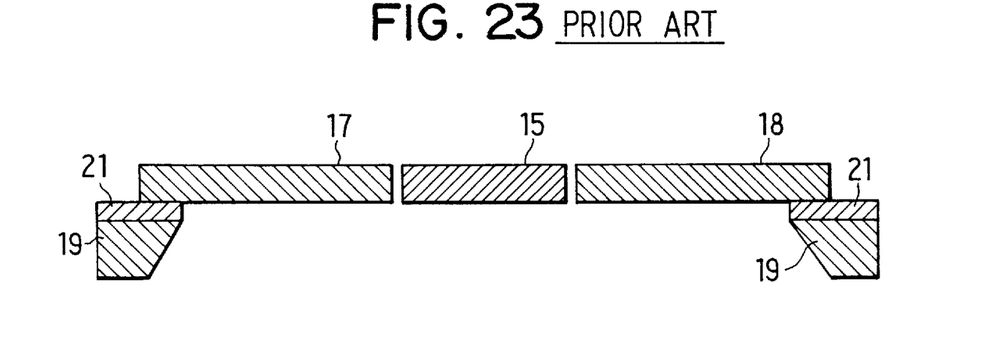
FIG. 23 is a sectional view of the conventional accelerometer device taken along line XXIII—XXIII in FIG. 22.

In a conventional differential capacitor type semiconductor accelerometer device 11, as shown in FIGS. 22 and 23, a weight portion 15 and a comb-shaped movable electrode 16 are formed integrally on a semiconductor layer of a semiconductor substrate (Si) 19 to provide a movable unit 12. A pair of comb-shaped fixed electrodes 17 and 18 are formed also on the semiconductor substrate 19 through an insulator layer ($SiO_2$) 21 to face the movable electrode 16. The movable electrode 16 and the fixed electrodes 17 and 18 are spaced apart and electrically insulated by a trench formed on the semiconductor substrate 19 to provide capacitors between detection surfaces thereof facing each other. The movable unit 12 is supported at both ends thereof by the semiconductor substrate 19 and movable in an axial direction of the movable unit 12 (in up-down direction in FIG. 22) in response to acceleration exerted thereon to change the capacitance between the movable electrode 16 and the fixed electrodes 17 and 18.

In this accelerometer device 11, the electrodes 16, 17 and 18 are in plate shape and have respective self-weights. As a result, the electrodes 16, 17 and 18 are likely to be broken by the respective self-weights when a large acceleration is exerted in a direction (up-down direction in FIG. 23) perpendicular to the direction of acceleration to be detected (up-down direction in FIG. 22). If the electrode width is narrowed to reduce the respective self-weights, the strength of the electrodes against the torsion or twist force will be lessened.

Figure 24:
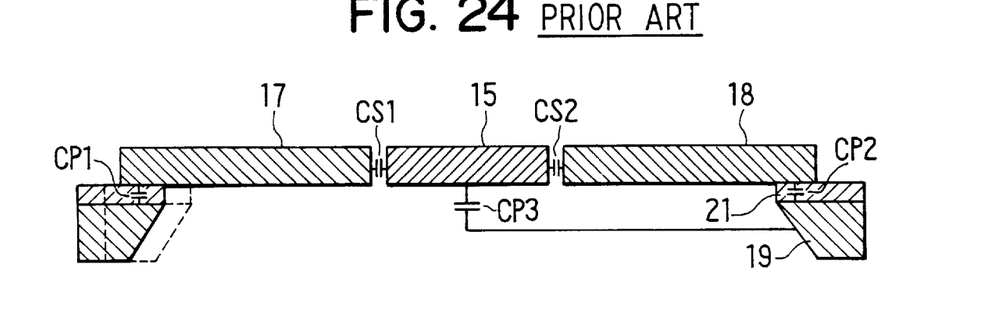
FIG. 24 is a sectional view of the conventional accelerometer device with parasitic capacitors and variable capacitors shown therewith.

Further, in this accelerometer device 11, parasitic capacitors CP1, CP2 and CP3 are formed in addition to capacitors CS1 and CS3 between the movable electrode 16 and the fixed electrodes 17 and 18 as shown in FIG. 24. Specifically, the capacitors CP1, CP2 and CP3 are formed between a connecting part 170 of the fixed electrode 17 and the substrate 19, between a connecting part 180 of the fixed electrode 18 and the substrate 19 and between the movable electrode 16 and the substrate 19, respectively. The capacitors CS1 and CS3 are variable in response to the movement of the movable unit 12.

Figure 25:
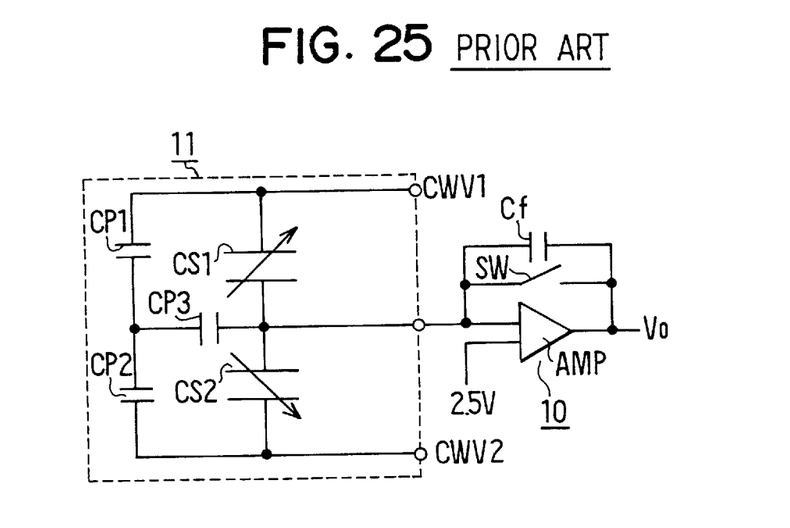
FIG. 25 is an electric circuit diagram of the conventional device shown in FIG. 24.
Figure 26:
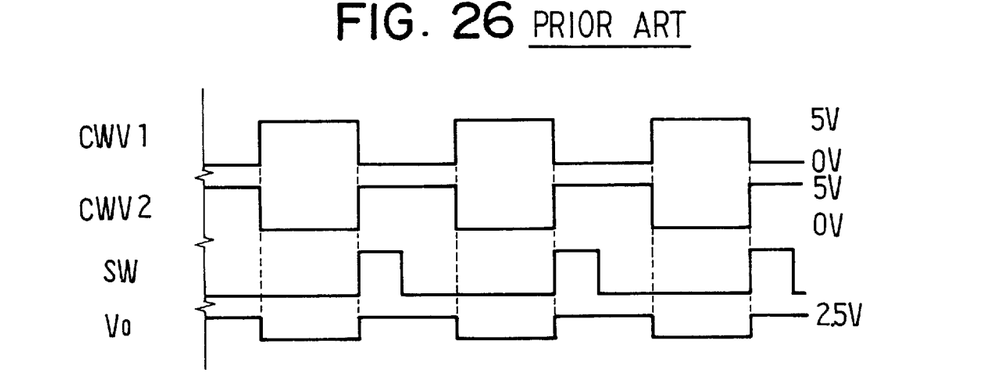
FIG. 26 is a timing diagram showing operation of the electric circuit of the conventional device.

The capacitance changes of the capacitors CS1 and CS2 caused by the acceleration may be detected by a switched capacitor circuit 10 connected to pads 28, 29 and 30 of the accelerometer device 11 as shown in FIG. 25. Specifically, the switched capacitor circuit 10 comprises an amplifier AMP, a capacitor Cf and an on/off switch SW. The circuit 10 is designed to operate differentially to produce an output voltage Vo when carrier wave voltages CWV1 and CWV2 are applied as shown in FIG. 26. The output voltage Vo is expressed as follows.

$$Vo = [(CS1-CS2)+(CP1-CP2)\times CP3]\times V \div Cf$$

As long as the capacitance of the parasitic capacitors CP1 and CP2 are equal to each other, the output voltage Vo varies solely in accordance with changes in capacitance of the capacitors CS1 and CS2. However, if the position of etching the substrate 19 varies as shown by the dotted line in FIG. 24, the parasitic capacitor CP1 becomes larger than the parasitic capacitor CP2. This difference in the parasitic capacitors CP1 and CP2 causes an offset voltage, which is a deviation of the output voltage Vo from zero, even when no acceleration is applied.

SUMMARY OF THE INVENTION

It is therefore an object of the present invention to provide a semiconductor dynamical quantity sensor device, which is light in weight and durable against accelerations in varying directions.

It is another object of the present invention to provide a semiconductor dynamical quantity sensor device, which minimizes parasitic capacitors to reduce an offset voltage.

According to the present invention, a semiconductor accelerometer device is formed on an SOI substrate by micro-machining. A movable unit has a weight portion and a comb-shaped movable electrode formed integrally. A pair of comb-shaped fixed electrodes are cantilevered and interleaved with the movable electrode to face the movable electrode. When acceleration is exerted in the acceleration detection direction in which the electrodes face, the weight portion moves to change the capacitance between the movable electrode and the fixed electrodes. A plurality of through holes is provided in the electrodes so that the electrodes have Rahmen structure, which is a series connection of rectangular frames. This structure reduces the weight of each electrode while increasing the strength against twist force. The electrodes are less likely from breaking in response to acceleration exerted in a direction perpendicular to the normal detection direction because of reduced weight.

The electrodes are connected to a switched capacitor circuit, which produces an output voltage corresponding to the capacitance changes caused by the acceleration. To reduce offset of the output voltage, connecting parts of the fixed electrodes to the circuit are also formed in Rahmen structure, or formed only on an insulator of the SOI substrate.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention is described with reference to various embodiments and modifications throughout which the same or similar component parts are designated by the same or similar reference numerals.

(First Embodiment)

Figure 1:
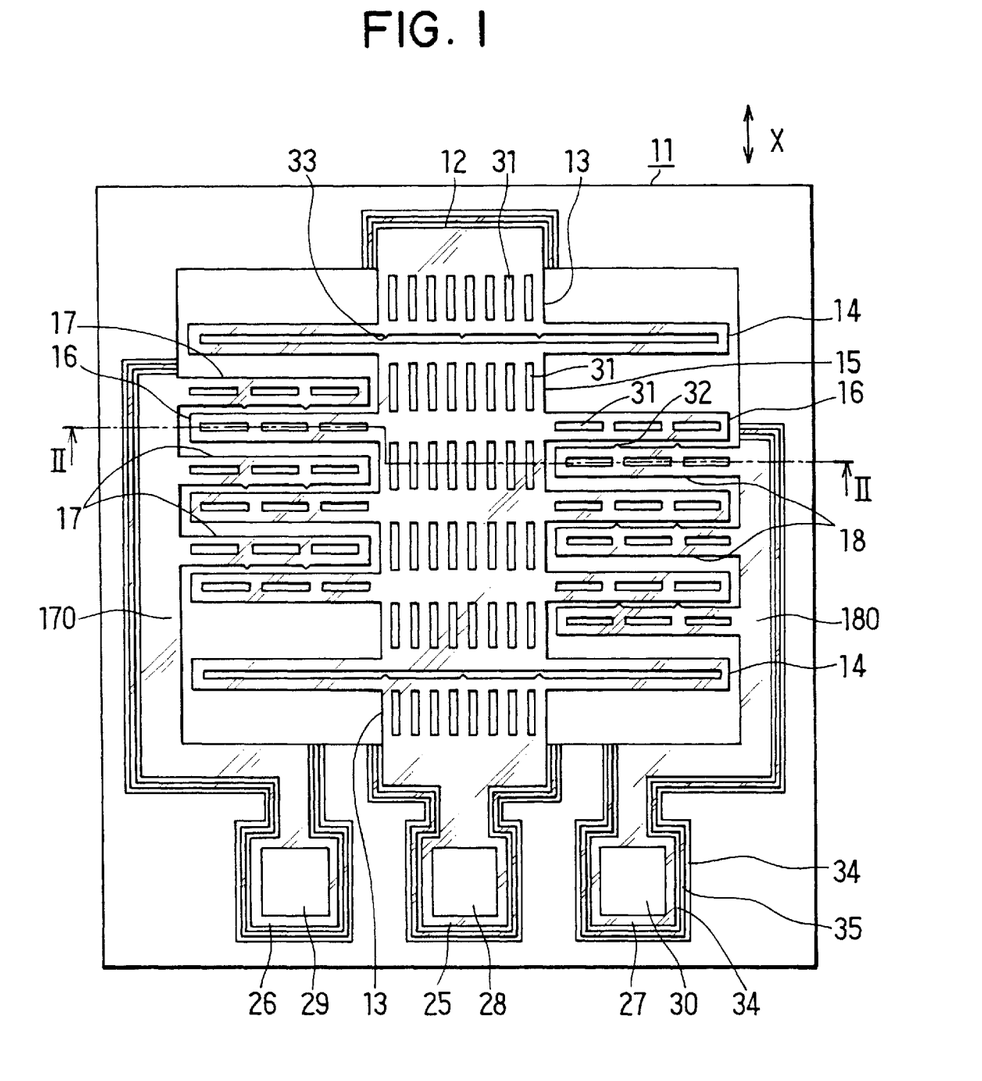
FIG. 1 is a schematic plan view of a semiconductor accelerometer device according to a first embodiment of the present invention.

Referring first to FIG. 1, a semiconductor accelerometer device 11 is formed on an SOI substrate by using the semiconductor fabrication process.

A movable unit 12 has anchors 13, rectangle-shaped springs 14 integral with the respective anchors 13, a weight portion 15 integral with and provided between the springs 14, and a comb-shaped movable electrode 16 integral from the weight portion 15. The movable electrode 16 has a plurality of parallel fingers extending laterally from the weight portion 15 in opposite directions. A pair of comb-shaped fixed electrodes 17 and 18 is provided at both lateral sides of the weight portion 15. Each of the fixed electrodes 17 and 18 has a plurality of fingers extending laterally between the fingers of the movable electrode 16.

Figure 2:
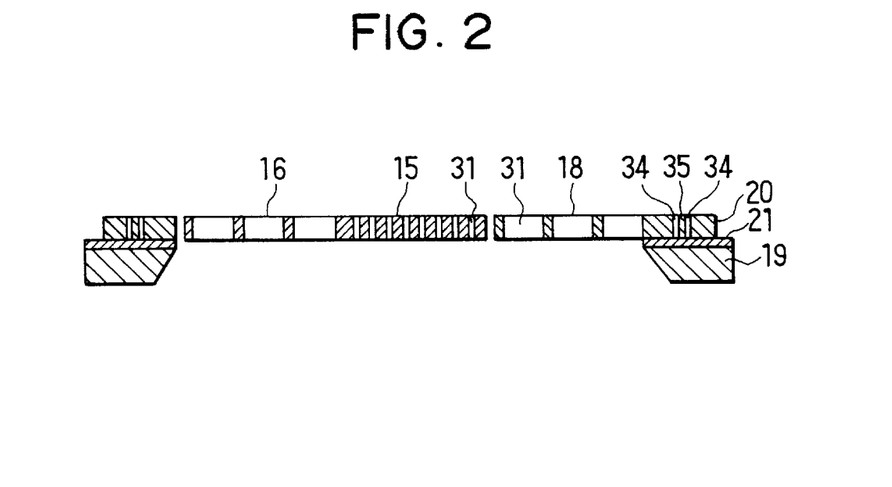
FIG. 2 is a sectional view of the accelerometer device taken along line II—II in FIG. 1.

As shown in FIG. 2, the accelerometer device 11 is fabricated from the SOI substrate, which comprises a first semiconductor layer (Si) 19, a second semiconductor layer (Si) 20 and an insulator layer ($SiO_2$) 21 as a support layer. The first semiconductor layer 19 and the insulator layer 21 are removed to expose the second semiconductor layer 20 over the area where the movable unit 12 and the fixed electrodes 17 and 18 are formed.

In fabricating the accelerometer device 11, aluminum (Al) is vapor-deposited on the top surface of the SOI substrate at pad portions 25 to 27 to form the electrode pad portions 28 to 30. After polishing the bottom surface of the SOI substrate, plasma SiN is accumulated. Then, the plasma SiN film is etched to form a predetermined pattern.

Then, PIQ (polyimide) is pasted on the top surface of the SOI substrate, and the PIQ film is etched in a predetermined pattern which corresponds to the movable unit 12 and the fixed electrodes 17 and 18. A resist is pasted as a protective layer on the PIQ film. The SOI substrate is etched deeply by, for instance, KOH aqueous solution, while using the bottom side plasma SiN film as a mask. In this deep etching, the insulator layer 21 functions as an etching stopper, because the etching speed of the insulator layer 21 is slower than that of the Si semiconductor layer.

Next, after removing the exposed insulator layer 21 and plasma SiN film by the HF aqueous solution, the resist covering the top surface of the SOI substrate is removed. The second semiconductor layer 20 is dry-etched to form holes therethrough, while using the PIQ film as a mask. Thus, the movable unit 12 and the fixed electrodes 17 and 18 are formed in the second semiconductor layer 20. Finally, the PIQ film on the top surface is removed by the $O_2$ ashing.

In the accelerometer device 11 as fabricated above, the both axial ends of the movable unit 12 are supported on the insulator layer 21, and the fixed electrodes 17 and 18 are cantilevered on the insulator layer 21.

A plurality of through holes 31 is formed in the movable unit 12 and the fixed electrodes 17 and 18, so that each of the movable unit 12 and the fixed electrodes 17 and 18 is shaped in the Rahmen structure (rigid frame structure). This structure is a series connection of a plurality of rectangular frames. The through holes 31 are formed simultaneously with the holes (trench) which are formed by dry-etching the second semiconductor layer 20 to form the movable unit 12 and the fixed electrodes 17 and 18. Each finger of the movable electrode 16 is positioned at the connection between the adjacent two of the rectangular frames forming the weight portion 16.

Figure 3:
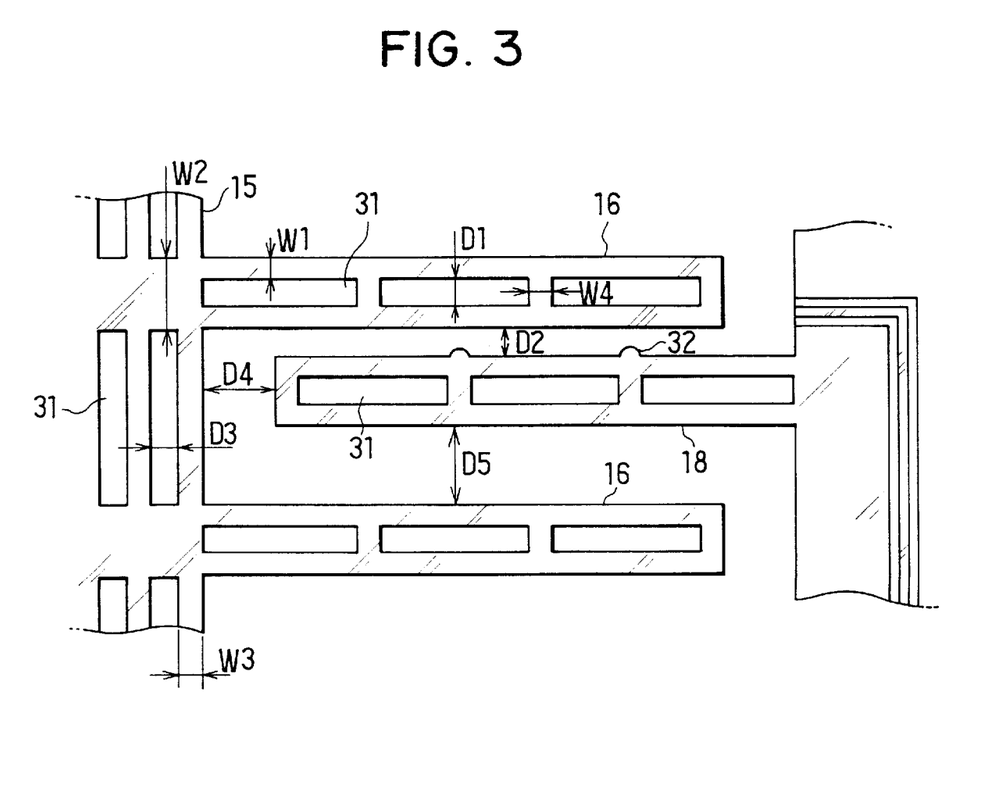
FIG. 3 is an enlarged plan view of a fixed electrode and a movable electrode of the device shown in FIG. 1.

The movable unit 12 and the fixed electrodes 17 and 18 are sized to satisfy the following relations (1) to (4), so that trench etching may be performed accurately. In the following relations, width (thickness of frame wall) W1 to W4 and width (spacing interval between frame walls) D1 to D5 are defined as shown in FIG. 3. Specifically, W1 to W4 and D1 to D5 are defined as follows.

"W1": axial width of each laterally extending wall of the fingers of the electrodes 16, 17 and 18;

"W2": axial width of each laterally extending wall of the weight portion 15 existing at the connection with each finger of the movable electrode 16, and "W2" also equals the total width of each rectangular frame of electrodes 16, 17 and 18 (see equation (4) below);

"W3": lateral width of each axially extending wall of the weight portion 15;

"W4": lateral width of each axially extending wall of the fingers of the electrodes 16, 17 and 18;

"D1": axial width of each through hole 31 in the fingers of the electrodes 16, 17 and 18;

"D2": axial width between facing surfaces of the adjacent fingers of the electrodes 16, 17 and 18, the facing surfaces being for detecting capacitance changes therebetween;

"D3": lateral width of each through hole 31 of the weight portion 15;

"D4": lateral width between the weight portion 15 and each free end of the fixed electrodes 17 and 18; and "D5": axial width between facing surfaces of the adjacent fingers of the electrodes 16, 17 and 18, the facing surfaces being not for detecting capacitance changes therebetween.

(1) W1=W3=W4
(2) D1=D2=D3
(3) D4=D5
(4) W2=W1×2+D1

As shown in FIG. 3, the fixed electrodes 17 and 18 have a plurality of protrusions 32 at the respective detection surfaces which face the detection surfaces of the movable electrode 16. The protrusions 32 are only on the surfaces to be used to detect capacitance change in response to the movement of the movable electrode 16 relative to the fixed electrodes 17 and 18. As the spacing interval between the movable electrode 16 and the fixed electrodes 17 and 18 varies in response to the movement of the weight portion 15 when subjected to the acceleration, the movable electrode 16 is likely to stick to the fixed electrodes 17 and 18 because of the external electrostatic force. This sticking disables the detection of capacitance changes which correspond to the applied acceleration. The protrusions 32, however, restrict the sticking of the movable electrode 15 to the fixed electrodes 17 and 18. The protrusions 32 are formed preferably only on the parts where no through holes 31 are formed, that is, only on the connection parts (width W4) of the rectangular frame structures which constitute the fingers of the fixed electrodes 17 and 18.

Similarly, as shown in FIG. 1, a plurality of protrusions 33 is formed on the inside surface of the spring 14 to restrict sticking between a pair of the laterally extending parts because of the external electrostatic force. The protrusions 33 are formed at the connecting position (width W3) between the rectangular frames in the anchor 13.

Figure 4:
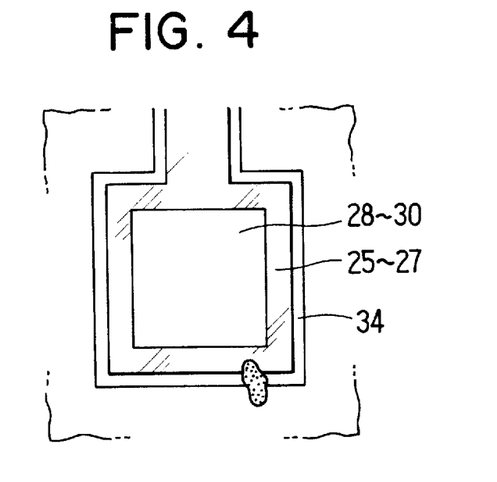
FIG. 4 is a schematic plan view of a pad, which is to be compared with that of the device shown in FIG. 1.
Figure 5:
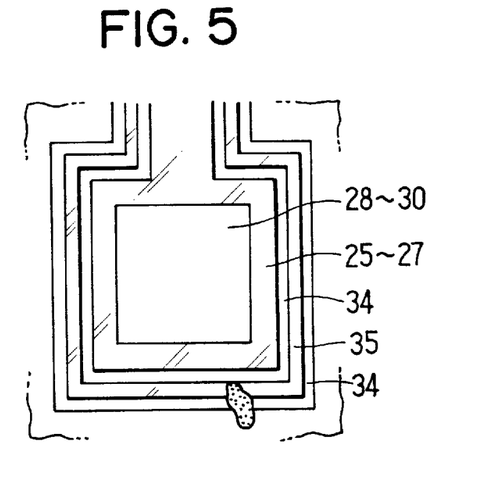
FIG. 5 is a schematic plan view of a pad of the device shown in FIG. 1.

The pad portions 25 to 27 are separated physically and electrically by a pair of grooves 34 from the surrounding portions which is the second semiconductor layer 20, so that the electric pads 28 to 30 connected to the corresponding electrodes 16, 17 and 18 through connecting parts 170, 180 and the like are electrically connected to an external detection circuit such as the switched capacitor circuit 10 shown in FIG. 25. If only one groove 34 is formed as shown in FIG. 4, the pad portions 25 to 27 are likely to short to the surrounding portions in the event that a conductive foreign matter such as a conductive dust bridges the groove 34. This shorting problem may be eliminated by widening the groove 34. However, this groove width becomes different from the other groove width, resulting in complication of fabricating process and reduction in the accuracy in final product size. Therefore, in this embodiment, two grooves 34 are formed to provide a bank wall 35 therebetween as shown in FIG. 5 to reduce the possibility of shorting between the pad portions 25 to 27 and the surrounding portions. Thus, each groove 34 may be sized to the same width as the other grooves (trench or hole).

Figure 6A:
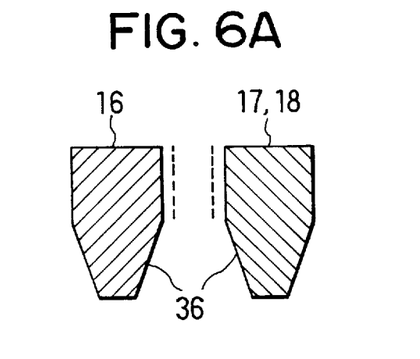
FIGS. 6A and 6B are schematic sectional views of the fixed electrode and the movable electrode of the device shown in FIG. 1.
Figure 6B:
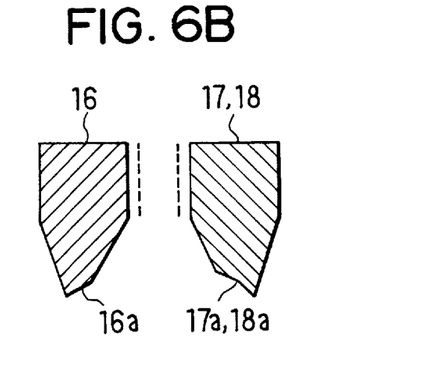
Figure 7A:
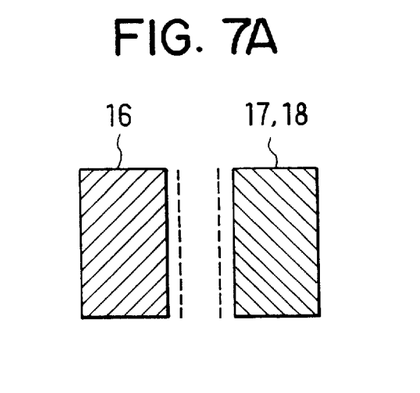
FIGS. 7A and 7B are schematic sectional views of a fixed electrode and a movable electrode to be compared with those shown in FIGS. 6A and 6B.
Figure 7B:
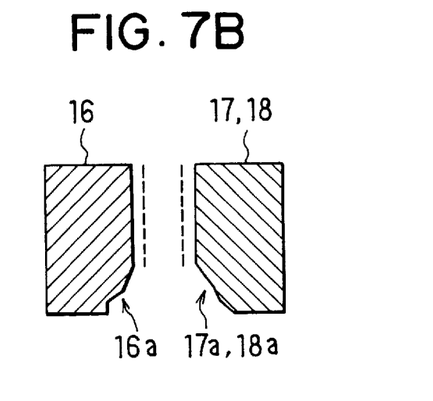

Each of the electrodes 16, 17 and 18 are tapered from the middle part toward the bottom side as indicated at 36 in FIG. 6A. That is, a predetermined capacitance is provided between the upper halves of the detection surfaces of the electrodes 16, 17 and 18 facing each other as shown by dotted lines. Even if notches 16a, 17a and 18a are produced on the tapered surfaces as shown in FIG. 6B in the course of forming electrodes, the predetermined capacitance (dotted lines) is maintained. This is because the notches 16a, 17a and 18a will occur on the tapered surfaces only. On the contrary, if the electrodes 16, 17 and 18 are not tapered as shown in FIG. 7A, the capacitance (dotted line) is likely to decrease because of the notches 16a, 17a and 18a occurring at the lower halves of the electrodes 16, 17 and 18 as shown in FIG. 7B. Those notches will vary from wafer to wafer and from chip to chip, causing irregularity in capacitance among the final products.

The above semiconductor accelerometer 11 is sized preferably as follows:

(1) Width of anchor 13 and weight portion 15=10–200 $\mu$m;
(2) Length of electrodes 15, 16 and 17=100–500 $\mu$m;
(3) Width of spring 14=2–10 $\mu$m;
(4) Length of spring 14=100–500 $\mu$m; and
(5) Spacing between electrode 16 and electrodes 17 and 18=2–4 $\mu$m.

In operation, when the acceleration is exerted on the movable unit 12 in the acceleration detection direction (X in FIG. 1), that is, in the axial direction in which the movable electrode 16 faces the fixed electrodes 17 and 18, one of the spacing interval between the detection surfaces of movable electrode 16 and the fixed electrodes 17 and 18 increases, and the other of the spacing interval between detection surfaces of the movable electrode 16 and the fixed electrodes 17 and 18 decreases. As those detection surfaces form capacitors, the respective capacitance change in response to the acceleration. Those changes are detected by the switched capacitor circuit 10 shown in FIG. 25, for instance.

In the event that acceleration is exerted on the moving unit 12 in a direction (up-down direction in FIG. 2) perpendicular to the normal detection direction (X), the moving unit 12 and the fingers of the fixed electrodes 17 and 18 are less likely to break because all of the moving unit 12 and the fixed electrodes 17 and 18 are constructed in light weight by the use of Rahmen structure.

Figure 8:
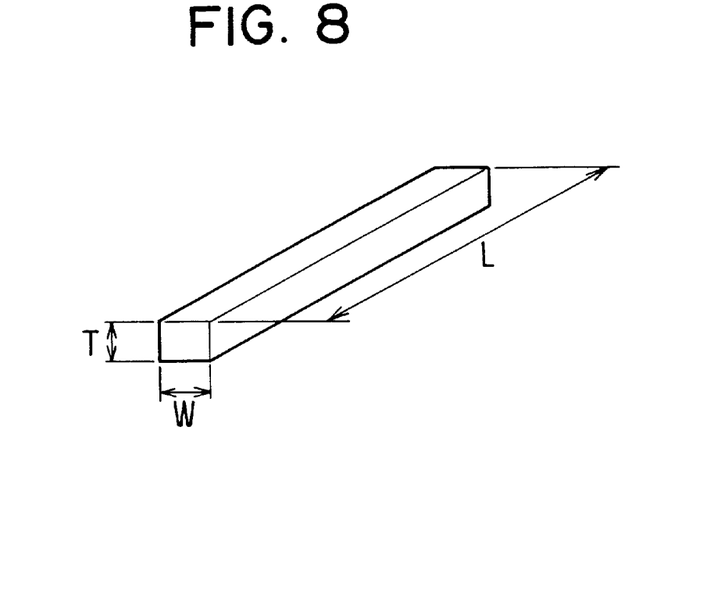
FIG. 8 is a schematic perspective view of each finger portion of the electrode used in the device shown in FIG. 1.

More specifically, in the event that a rod shown in FIG. 8 is deformed, the deformation of the rod and the maximum stress which exerts on the rod is expressed as follows.

Deformation=(acceleration×weight)÷(spring constant in deformation direction)

Maximum stress=2×(Young's modulus)×(T or W)×(rod deformation)÷$L^2$

Figure 9:
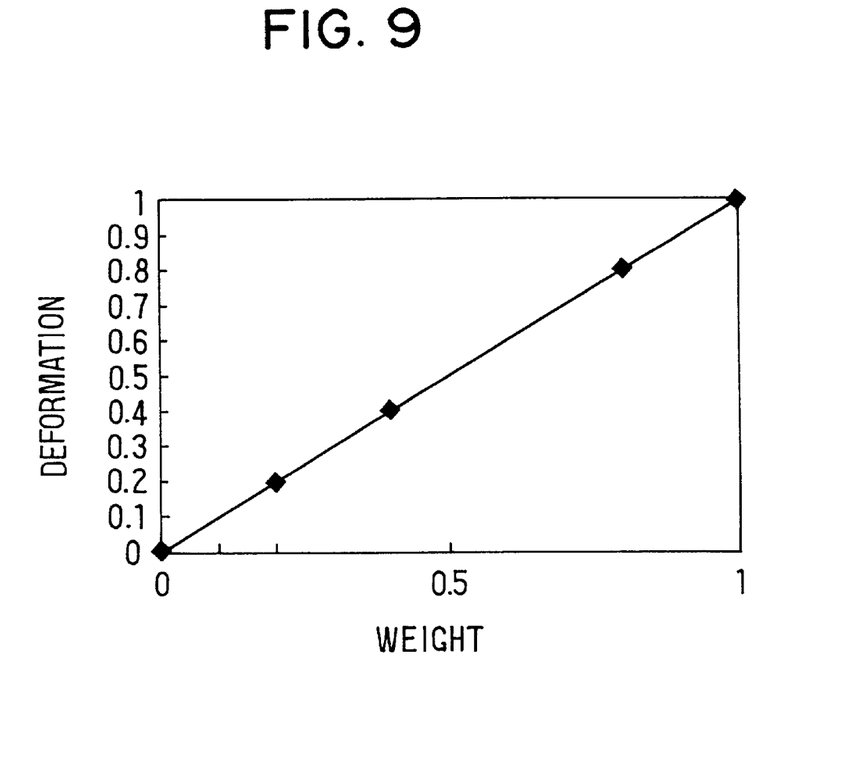
FIG. 9 is graph showing the relation between the weight of the finger shown in FIG. 8 and the deformation of the same.

As a result, as shown in FIG. 9, the deformation of rod and the maximum stress increase as the weight of the rod increases. In the case of the movable unit 12 fixedly supported at both ends and the fixed electrodes 17 and 18 fixedly supported only at one end, the influence of the acceleration exerted in the direction perpendicular to the normal detection direction is reduced more as the weight is lighter. Therefore, Rahmen structure is effective to reduce the weight of the movable unit 12 and the fixed electrodes 17 and 18 for less deformation and less stress without lessening the strength against the twist force.

The widths of the rectangular frame walls and the spacing interval between the frame walls of the moving unit 12 and the fixed electrodes 17 and 18 are sized uniform as much as possible. Therefore, variations in size of the component parts can be reduced to a minimum, and the final products can have the uniform quality.

As the anchor 13 and the weight portion 15 are constructed to have the same Rahmen structure as in the electrodes 16, 17 and 18, the finished size after etching can be maintained uniformly to provide finished products with uniform quality. In addition, as the fingers of the movable electrode 16 are connected to the connection position of the rectangular frames in the weight portion 15, that is, connected to the most rigid part of the weight portion 15, the movable electrode 16 can be maintained resistive to the acceleration exerted in the direction perpendicular to the normal detection direction.

(Modification)

Figure 10:
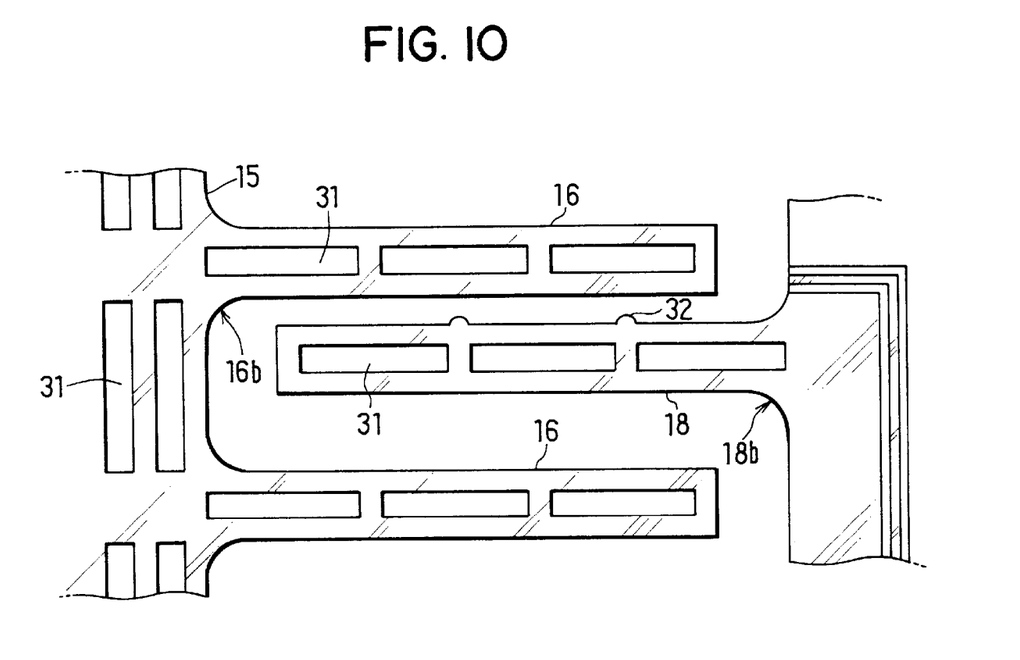
FIG. 10 is an enlarged plan view of a fixed electrode and a movable electrode of a semiconductor accelerometer device according to a modification of the first embodiment.

The electrodes 16, 17 and 18 may be formed with reinforcing portions 16b, 17b and 18b in arcuate shape at the respective roots of the fingers as shown in FIG. 10. Those reinforcing portions 16b, 17b and 18b strengthen the connection of the fingers to restrict breakage of the fingers even when stress concentrates at the root portions in response to acceleration exerted in the direction perpendicular to the normal detection direction.

Figure 11:
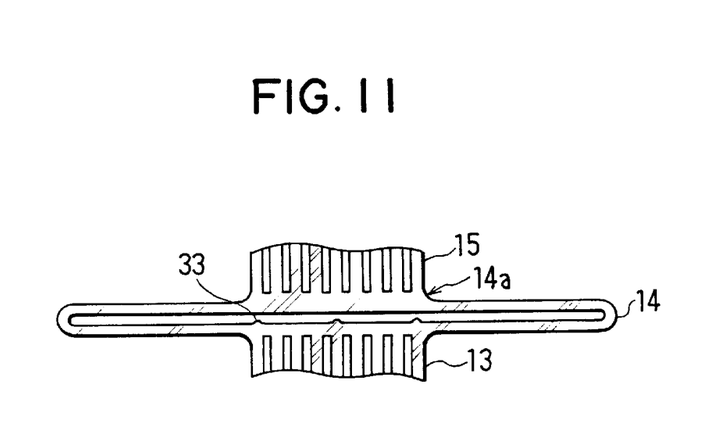
FIG. 11 is an enlarged plan view of a spring of a semiconductor accelerometer device according to a modification of the first embodiment.

Similarly, the spring 14 may be connected to the anchor 13 and the weight portion 15 through arcuate reinforcing portions 14a as shown in FIG. 11. Those reinforcing portions 14a restrict the spring 14 from breaking even when stress concentrates at the connection portion. Further, the ends of the spring 14 may be formed in an arcuate shape to restrict the spring 14 from breaking when stress concentrates at the ends because of resilient flexing of the spring 14.

Figure 12:
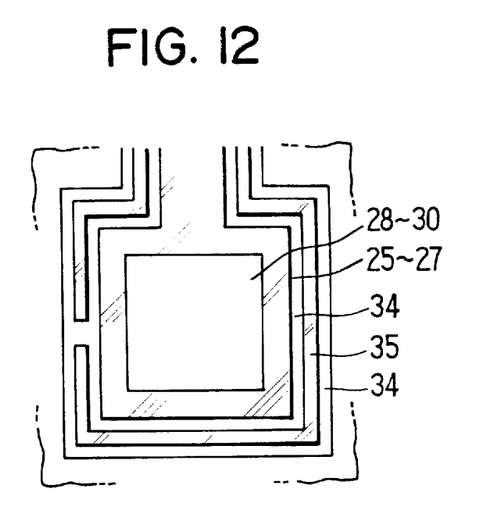
FIG. 12 is an enlarged plan view of a pad of a semiconductor accelerometer device according to a modification of the first embodiment.
Figure 13:
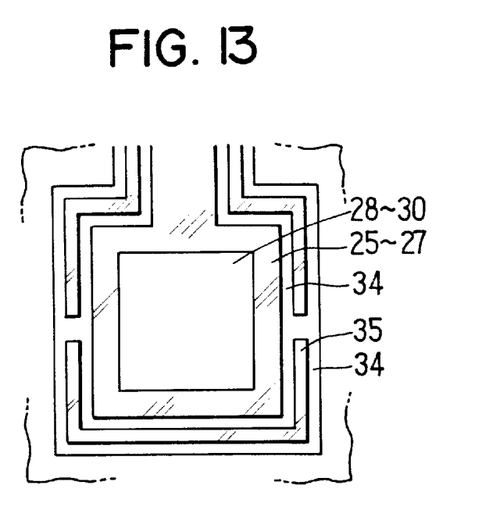
FIG. 13 is an enlarged plan view of a pad of another semiconductor accelerometer device according to a modification of the first embodiment.

The bank wall 35 surrounded by the grooves 34 formed around the pad portions 25 to 27 may be cut dynamically and electrically at one location as shown in FIG. 12 or at a plurality of locations as shown in FIG. 13. Those cuts can greatly reduce possibility of electrical shorting between the pad portions 25 to 27 and the surrounding portions (second semiconductor layer 20), even when the bank wall 35 is connected to the surrounding portion through a conductive dust and also to the pad portions 25 to 27 through another conductive dust.

Figure 14:
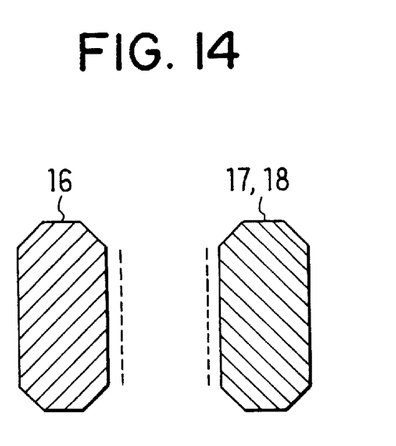
FIG. 14 is a schematic sectional view of a fixed electrode and a movable electrode of a semiconductor accelerometer device according to a modification of the first embodiment.
Figure 15:
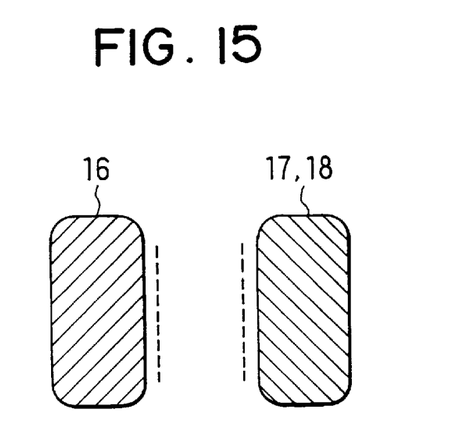
FIG. 15 is a schematic sectional view of a fixed electrode and a movable electrode to be compared with those shown in FIG. 14.

Still further, the electrodes 16, 17 and 18 may be tapered at both top side and bottom side as shown in FIG. 14. Alternatively, the corners of the electrodes 16, 17 and 18 may be rounded as shown in FIG. 15. The rounded corners will reduce influence caused by notches and restrict concentration of stress even when acceleration is exerted on the electrodes 16, 17 and 18.

Figure 16:
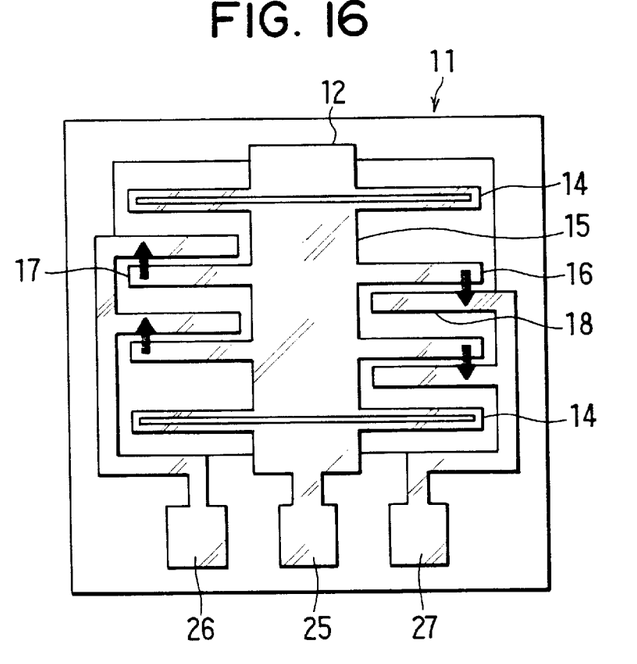
FIG. 16 is a schematic plan view showing electrostatic force which exerts between the electrodes the device according to the first embodiment.
Figure 17:
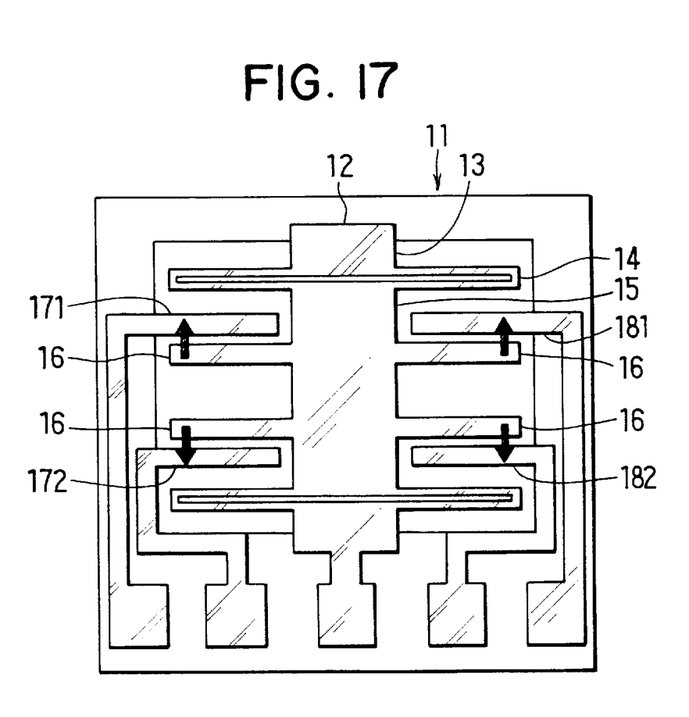
FIG. 17 is a schematic plan view of a semiconductor accelerometer device according to a modification of the first embodiment.

In the first embodiment, the electrostatic force exerts between the movable electrode 16 and the fixed electrodes 17 and 18 in opposite directions as shown by arrows in FIG. 16. This electrostatic force results in the moment which tends to rotate the movable unit 12 in the clockwise direction. Thus, the spacing interval between the capacitance detection surfaces between the movable electrode 16 and the fixed electrodes 17 and 18 are likely to deviate from the original spacing interval, resulting in lessening the accuracy of acceleration detection. It is therefore preferred to arrange four fixed electrodes 171, 172, 173 and 174 as shown in FIG. 17, so that the electrostatic force exerted between the movable electrode 16 and the fixed electrodes 171 and 181 balances with the electrostatic force exerted between the movable electrode 16 and the fixed electrodes 172 and 182. Thus, the moment which exerts to rotate the movable unit 12 is restricted.

The material used for the structural body of the accelerometer device may be a single silicon, poly silicon or metal. Further, nonconductive material such as ceramics, glass, crystal or resin may be used for the structural body as long as a conductive material is vapor-deposited thereon. In this instance, the SOI structure need not be provided as long as the material for the structural body has an insulating property.

(Second Embodiment)

Figure 18:
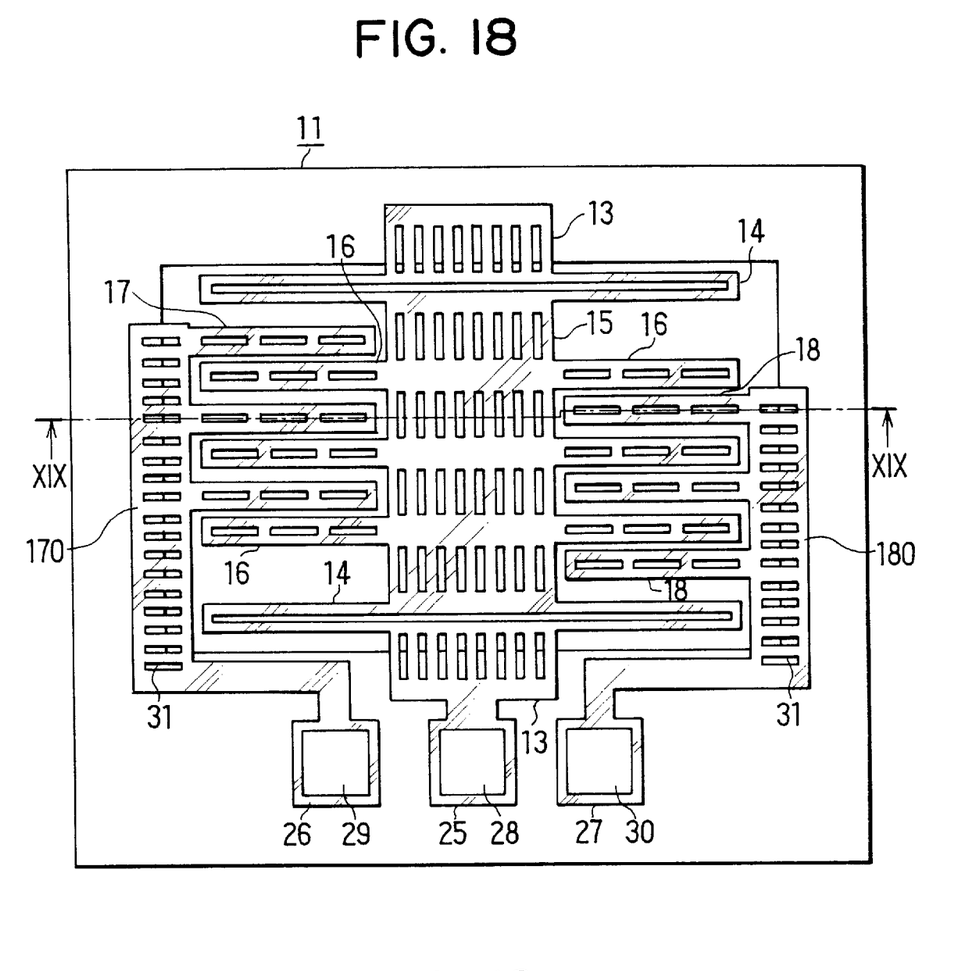
FIG. 18 is a schematic plan view of a semiconductor accelerometer device according to a second embodiment of the present invention.
Figure 19:
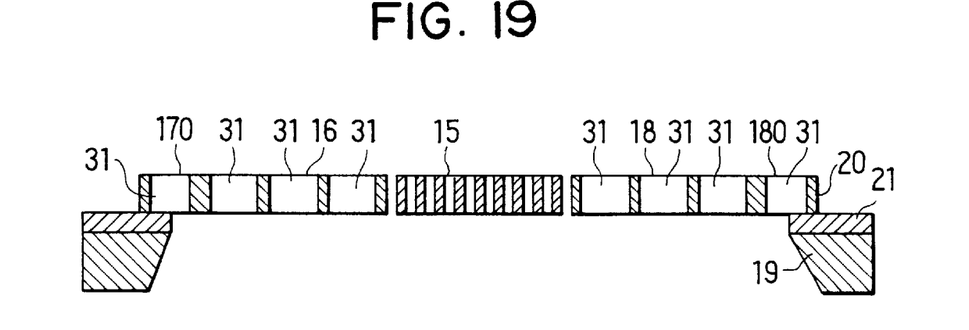
FIG. 19 is a sectional view of the accelerometer device taken along line XIX—XIX in FIG. 18.

In this embodiment, as shown in FIGS. 18 and 19, not only the fingers of the movable electrode 16 and the fixed electrodes 17 and 18 are constructed in Rahmen structure, but also connecting portions 170 and 180 connecting the fixed electrodes 17 and 18 to the pads 29 and 30 are also constructed in Rahmen structure by a plurality of through holes 31.

According to this embodiment, the capacitance of the parasitic capacitors CP1, CP2 and CP3 which occur as shown in FIG. 24 can be reduced to a smaller value than in the conventional device (FIG. 22). Therefore, when this accelerometer device 11 is connected to the switched capacitor circuit 10 as shown in FIG. 25, offset of the output voltage Vo produced from the switched capacitor circuit 10 is reduced even when etching of the bottom side of the semiconductor layer 21 varies in the fabrication process.

(Third Embodiment)

Figure 20:
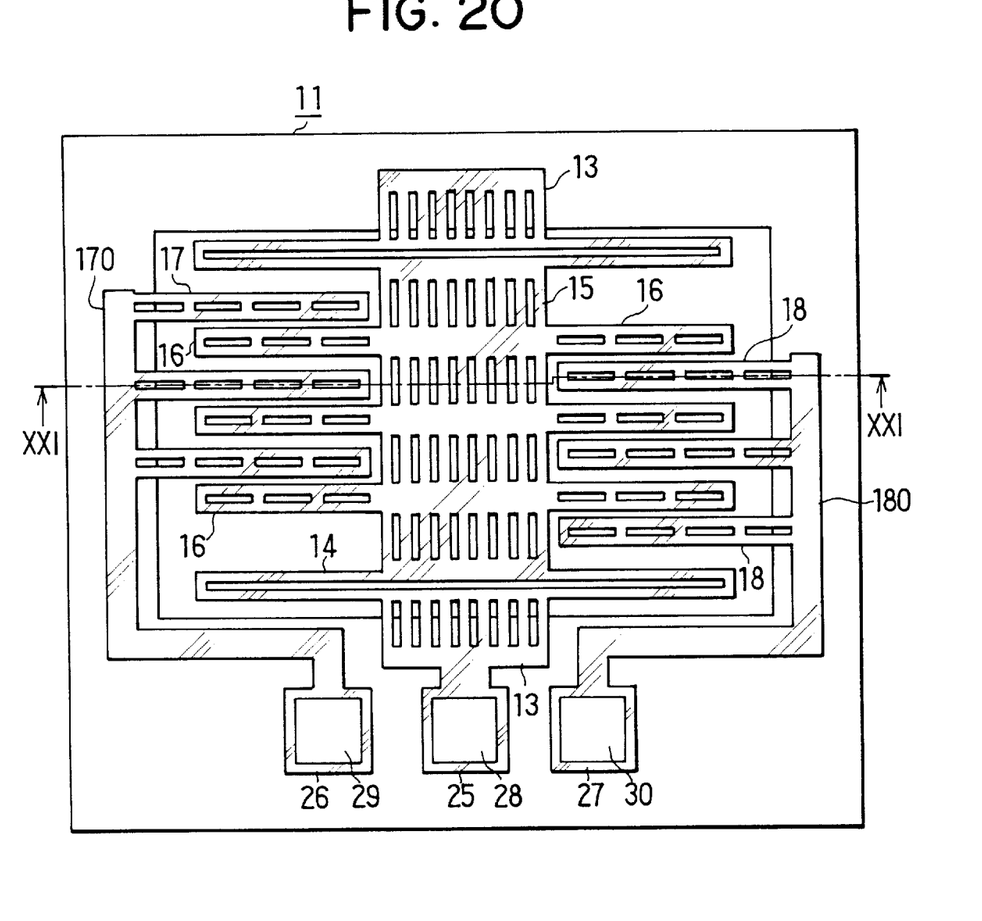
FIG. 20 is a schematic plan view of a semiconductor accelerometer device according to a third embodiment of the present invention.
Figure 21:
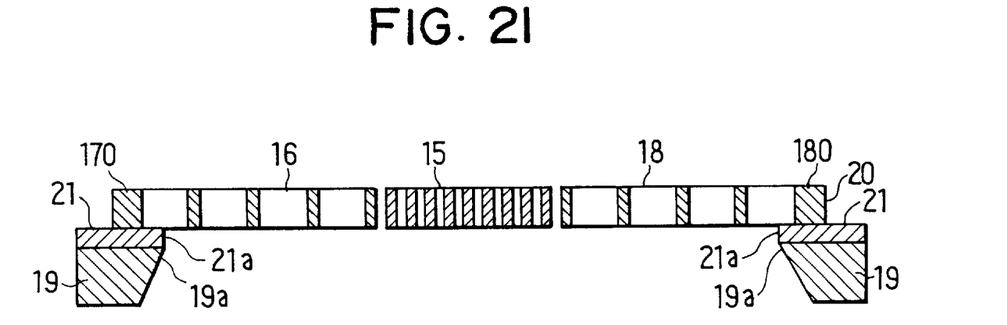
FIG. 21 is a sectional view of the accelerometer device taken along line XXI—XXI in FIG. 20.

In this embodiment, as shown in FIGS. 20 and 21, the first semiconductor layer 19 and the insulator layer 21 have respective innermost ends 19a and 21a at a position below the fixed electrodes 17 and 18. That is the connecting portions 170 and 180 are formed only on the insulator layer 21. As a result, the capacitance of the parasitic capacitors CP1, CP2 and CP3 which occur as shown in FIG. 24 can be reduced further than in the second embodiment.

When this accelerometer device 11 is connected to the switched capacitor device as shown in FIG. 25, the detected acceleration is represented by the output voltage Vo which is expressed as follows:

$$Vo[(CS1-CS2)+(CP1-CP2) \times CP3] \times V \div Cf$$

As $(CP1-CP2) \times CP3$ is reduced also because of reduction in the capacitance of the parasitic capacitors, the resulting offset of the output voltage Vo produced from the switched capacitor circuit 10 is reduced even when etching of the bottom side of the semiconductor layer 21 varies in the fabrication process.

It is to be noted that the above modifications of the first embodiment may also be applied to the second and third embodiments.

Further, it is to be noted that the present invention may also be applied to other dynamical quantity sensor devices such as a yaw rate sensor and an angular velocity sensor. Further, the present invention may be applied to a capacitive type semiconductor pressure sensor, which has a diaphragm as a sensing structural body and uses the diaphragm as a movable electrode. Still further, the present invention may be applied to a contact type sensor, which detects on and off between a movable electrode and a fixed electrode.

We claim:

1. A semiconductor sensor device comprising:

a semiconductor substrate;

a movable unit supported on the semiconductor substrate, and having a weight portion movable in response to a dynamical force exerted thereon and a movable electrode formed integrally with the weight portion and having a detection surface; and a fixed electrode cantilevered on the semiconductor substrate and having a detection surface facing the detection surface of the movable electrode, wherein the movable electrode and the fixed electrode are constructed in Rahmen structure which includes a series of a plurality of rectangular frames.

2. A semiconductor sensor device of claim 1, wherein:

the weight portion is constructed in the Rahmen structure.

3. A semiconductor sensor device of claim 1, wherein:

the movable unit further has an anchor which connects the weight portion to the semiconductor substrate and is constructed in the Rahmen structure.

4. A semiconductor sensor device of claim 1, wherein:

the movable electrode is connected to the weight portion at a position where to rectangular frames of the weight portion are connected.

5. A semiconductor sensor device of claim 1, further comprising:

a protrusion formed on at least one of the movable electrode and the fixed electrode to restrict sticking between the movable electrode and the fixed electrode, the protrusion being provided at a position where the rectangular frames are connected.

6. A semiconductor sensor device of claim 1, further comprising:

a movable part having a spring which supports the weight portion, wherein the spring has a protrusion at a position where rectangular frames of the weight portion are connected.

7. A semiconductor sensor device of claim 1, wherein:

the movable electrode and the fixed electrode have tapered parts.

8. A semiconductor sensor device of claim 1, further comprising:

pads formed on the semiconductor substrate and connected electrically to the movable electrode and the fixed electrode, the pads being surrounded by a plurality of grooves to be insulated electrically from surrounding parts.

9. A semiconductor sensor device of claim 8, further comprising:

a bank wall provided between the grooves, wherein the bank wall is cut dynamically and electrically at least at one location.

10. A semiconductor sensor device of claim 1, wherein:

the rectangular frames of the Rahmen structure of the weight portion and the fixed electrode has a uniform wall thickness or a uniform spacing between walls.

11. A semiconductor sensor device of claim 10, wherein:

the weight portion has a wall thickness different from the uniform wall thickness at a position where the movable electrode is connected.

12. A semiconductor sensor device of claim 10, wherein a first spacing exists between the fixed electrode and the detection surface of the movable electrode and a second spacing exists between the fixed electrode and a non-detection surface of the movable electrode, the first spacing and the second spacing being different from each other.

13. A semiconductor sensor device of claim 10, wherein a first spacing exists between the fixed electrode and the weight portion and a second spacing exists between the fixed electrode and a non-detection surface of the movable electrode, the first spacing and the second spacing being equal to each other.

14. A semiconductor sensor device of claim 11, wherein:

the wall thickness of the weight portion is equal to a total width of each rectangular frame of the movable electrode and the fixed electrode.

15. A semiconductor sensor device of claim 10, wherein:

a total width of each rectangular frame of the movable electrode equals a total width of each rectangular frame of the fixed electrode.

16. A semiconductor sensor device of claim 1, wherein:

at least one of the movable electrode and the fixed electrode has protrusions on connection parts.

17. A semiconductor sensor device of claim 6, wherein:

the spring has reinforcing parts.

18. A semiconductor sensor device of claim 1, wherein:

the semiconductor substrate is an SOI substrate which has a first semiconductor layer, a second semiconductor layer and an insulator layer between the first semiconductor layer and the second semiconductor layer; and the movable electrode and the fixed electrode are formed from the second semiconductor layer with the first semiconductor layer and the insulator layer underside the movable electrode and the fixed electrode being removed.

19. A semiconductor sensor device of claim 1, further comprising:

a connecting part connected to the fixed electrode and constructed in the Rahmen structure.

20. A semiconductor sensor device of claim 1, further comprising:

a connecting part connected to the fixed electrode and provided only on the semiconductor substrate to reduce parasitic capacitance.

21. A semiconductor sensor device comprising:

a semiconductor substrate;

a fixed electrode fixedly supported on the semiconductor substrate at one end and forming a parasitic capacitor with the semiconductor substrate; and a movable electrode supported lovably on the semiconductor substrate and forming a variable capacitor with the fixed electrode, wherein the fixed electrode has at least one groove which extends from the semiconductor substrate, and wherein said fixed electrode and said movable electrode are constructed in Rahnen structure.

22. A semiconductor sensor device comprising:

a semiconductor substrate;

a fixed electrode fixedly supported on the semiconductor substrate at one end and forming a parasific capacitor with the semiconductor substrate; and a movable electrode supported movably on the semiconductor substrate and forming a variable capacitor with the fixed electrode, wherein the fixed electrode has at least one groove which extends from the semiconductor substrate, and wherein each of the fixed electrode and the movable electrode has a plurality of through holes to provide a series connection of rectangular frames which corresponds to Rahmen structure.

23. A semiconductor sensor device comprising:

a semiconductor substrate;

a movable unit supported on the semiconductor substrate, and having a weight portion movable in response to a dynamical force exerted thereon and a movable electrode formed integrally with the weight portion and having a detection surface; and a fixed electrode cantilevered on the semiconductor substrate and having a detection surface facing the detection surface of the movable electrode, wherein each of the movable electrode and the fixed electrode having a plurality of through holes arranged in a direction in which the movable electrode and the fixed electrode extend, and wherein said fixed electrode and said movable electrode are constructed in Rahmen structure.

* * * * *